US012112151B2

(12) United States Patent
Belgrave

(10) Patent No.: US 12,112,151 B2
(45) Date of Patent: Oct. 8, 2024

(54) COLLECTION AND REPRESENTATION OF PROGRAM CALL STACKS

(71) Applicant: MICROSOFT TECHNOLOGY LICENSING, LLC, Redmond, WA (US)

(72) Inventor: Beau Allen Belgrave, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 105 days.

(21) Appl. No.: 18/087,652

(22) Filed: Dec. 22, 2022

(65) Prior Publication Data
US 2024/0069879 A1    Feb. 29, 2024

Related U.S. Application Data

(60) Provisional application No. 63/402,902, filed on Aug. 31, 2022.

(51) Int. Cl.
*G06F 8/41*       (2018.01)
*G06Q 30/018*  (2023.01)
(52) U.S. Cl.
CPC .......... *G06F 8/433* (2013.01); *G06Q 30/018* (2013.01)
(58) Field of Classification Search
None
See application file for complete search history.

(56) References Cited

U.S. PATENT DOCUMENTS

| 8,090,027 B2 | 1/2012 | Schneider |
| 8,595,702 B2 | 11/2013 | Maybee et al. |
| 11,126,657 B2 | 9/2021 | Zhang |
| 2004/0015920 A1* | 1/2004 | Schmidt .............. G06F 9/45516 717/162 |

(Continued)

FOREIGN PATENT DOCUMENTS

WO    2017151194 A1    9/2017

OTHER PUBLICATIONS

"Pointer (Computer Programming)", Retrieved from: https://en.wikipedia.org/w/index.php?title=Pointer_(computer_programming)&oldid=437038098, Jun. 30, 2011, 20 Pages.

(Continued)

*Primary Examiner* — Qing Chen
(74) *Attorney, Agent, or Firm* — Newport IP, LLC; Jacob P. Rohwer

(57) ABSTRACT

The techniques disclosed herein implement an improved format for transmitting call stacks (referred to herein as stacks) from machines to a stack analysis service. Moreover, the techniques implement an improved way for the stack analysis service to represent the large number of stacks. The improved format enables the collection of a large number of stacks (e.g., millions or even trillions of stacks) to be more efficient. The improved representation of a large number of stacks enables the analysis to be more efficient. Consequently, the techniques described herein reduce the carbon footprint for an organization that operates a group of machines because less network, storage, and/or processing resources are needed to collect and analyze a large number of stacks.

20 Claims, 11 Drawing Sheets

(56) References Cited

U.S. PATENT DOCUMENTS

| | | | |
|---|---|---|---|
| 2004/0083460 A1* | 4/2004 | Pierce | G06F 9/4486 |
| | | | 717/133 |
| 2010/0235815 A1* | 9/2010 | Maybee | G06F 11/3636 |
| | | | 717/125 |
| 2012/0297370 A1* | 11/2012 | Sale | G06F 11/3636 |
| | | | 717/128 |
| 2017/0322861 A1 | 11/2017 | Chan | |
| 2018/0101466 A1 | 4/2018 | O'dowd et al. | |

OTHER PUBLICATIONS

"Variable-Width Encoding", Retrieved from: https://web.archive.org/web/20220704103219/https://en.wikipedia.org/wiki/Variable-width_encoding, Sep. 23, 2021, 4 Pages.

Hamou-Lhadj, et al., "An Efficient Algorithm for Detecting Patterns in Traces of Procedure Calls", In Proceedings of ICSE Workshop on Dynamic Analysis, May 3, 2003, pp. 33-36.

"International Search Report and Written Opinion Issued in PCT Application No. PCT/US23/028306", Mailed Date: Oct. 20, 2023, 13 Pages.

Hofer, Peter, "Method Profiling and Lock Contention Profiling on the Java Virtual Machine Level", A Doctoral Thesis Submitted at Institute for System Software, Johannes Kepler University Linz, Oct. 2016, 145 Pages.

\* cited by examiner

COLLECTION AND REPRESENTATION OF PROGRAM CALL STACKS

PRIORITY APPLICATION

This application claims the benefit of and priority to U.S. Provisional Application No. 63/402,902, filed Aug. 31, 2022, the entire contents of which are incorporated herein by reference.

BACKGROUND

Developers of computer programs and/or operators of a large group of machines (e.g., servers, personal computers, Internet of Things (IoT) devices) often analyze call stacks to identify the most frequently used programming elements (e.g., subroutines, functions, statements), to determine systemic costs with regard to modifying programming elements, to identify which programming elements use most of the processing time, to implement stack traces for debugging purposes, etc. A call stack is a data structure that stores information about the flows of a computer program being executed. More specifically, a flow captures a call from one programming element to another programming element. The flows that can be added to a call stack include dedicated locations in memory (e.g., memory blocks) useable by a compiler and/or a processing unit (e.g., a central processing unit (CPU)). The dedicated locations are typically represented by a set of addresses (e.g., addresses "0000"-"9999").

Consequently, a call stack includes a plurality of flows in a defined sequence (e.g., flow A includes a call to flow B, which includes a call to flow C, and so forth). A flow in the call stack is represented by an address (e.g., flow A is represented by flow address "4096"). While a call stack can include any number of flows, a relatively small call stack generally includes eight to twelve flows while a relatively large call stack generally includes thirty to one hundred flows. It is worth noting that a call stack may alternatively be referred to as an execution stack, a program stack, a control stack, a run-time stack, or a machine stack, and is often referred to as simply the stack.

Oftentimes the aforementioned analysis needs to be performed on a whole fleet of machines within an organization. Depending on the size of the organization, a large number of stacks may need to be collected and stored. For instance, a cloud provider with multiple datacenters collects and analyze upwards of trillions of stacks every day. This collection and analysis can result in a large carbon footprint for the organization due to the energy used to operate resources to collect, to store, and/or to analyze the large number of stacks.

SUMMARY

The disclosed techniques implement an improved format for transmitting call stacks (referred to herein as stacks) from machines to a stack analysis service. Moreover, the techniques implement an improved way for the stack analysis service to represent the large number of stacks. The improved format enables the collection of a large number of stacks (e.g., millions or even trillions of stacks) to be more efficient. The improved representation of a large number of stacks enables the analysis to be more efficient. Consequently, the techniques described herein reduce the carbon footprint for an organization that operates a group of machines because less network, storage, and/or processing resources are needed to collect and analyze a large number of stacks.

The format used locally by the machines to transmit a stack to the stack analysis service employs address offsets to represent the flows in a stack. As described above, a stack is a data structure that stores information about the flows of a computer program being executed. More specifically, a flow captures a call from one programming element (e.g., a subroutine, a function, a statement) to another programming element. Consequently, a stack includes a sequence of flows (may alternatively be referred to herein as a flow sequence).

As described above, flows that can be added to a stack reside in dedicated locations in memory (e.g., memory blocks) useable by a compiler and/or a processing unit (e.g., a central processing unit (CPU)). The dedicated locations are typically represented by a set of addresses (e.g., addresses "0000"-"9999"). A flow in a stack is typically represented by an address (e.g., flow A is represented by flow address "4096").

The format for transmitting a stack from a machine to a stack analysis service employs an actual address to represent the first flow in the sequence of flows included in the stack. This actual address serves as a baseline address for the stack. However, the format does not employ actual addresses to represent the flows in the sequence of flows after the first flow. Rather, the format employs an address offset to represent each flow in the sequence of flows after the first flow. The address offset is a difference between an address of a current flow and an address of a previous flow that calls on the current flow. For instance, an address offset for flow B is the difference between the actual address for flow B and the actual address for flow A, an address offset for flow C is the difference between the actual address for flow C and the actual address for flow B, and so forth.

The use of address offsets enables storage space to be conserved and/or enables compression ratios related to the transmission of stacks to be increased because the values for the address offsets are typically smaller compared to the values for the actual addresses. The values for the address offsets are typically smaller compared to the values for the actual addresses because operating systems and/or compilers strive for high storage locality with regard to related programming elements. That is, programming elements that often call on one another are typically stored, e.g., by an operating system and/or a compiler, close to one another in memory (e.g., the addresses are close).

In various examples, the techniques further improve the efficiency with which stacks are transmitted by variable bit encoding the address offsets representing the flows in the stack. That is, the processing power used to prepare a stack for transmission is reduced by using variable bit encoding rather than conventional compression techniques (e.g., DEFLATE data compression, ZIP data compression), which require scanning previously seen data and finding duplicated parts of the data. Consequently, variable bit encoding the address offsets, rather than using entire addresses associated with machines, operating systems, and/or CPUs configured for sixty-four bit operation, allows for a lower processing cost to be realized, which is ideal in environments (e.g., datacenter operators, cloud providers) that are sensitive to power consumption and carbon footprints.

After machines locally package stacks for transmission using a format that employs address offsets and/or variable bit encoding, the stack analysis service collects the stacks and generates flow identifications for each of the flows in a stack. The stack analysis service is configured to recalculate an address for each flow in the stack using the baseline address that represents the first flow and the address offsets that represent the flows after the first flow. The addresses used for specific flows are consistent, or the same, across a fleet of machines, which enables the improved representation of a large number of stacks, as further described herein. For instance, if flow A is stored in address "4032" on one machine in the fleet, then flow A is stored in address "4032" across the machines in the fleet.

Once the stacks are collected by the stack analysis service, the stacks are represented in an effective manner that reduces the use of storage and processing resources. As described herein, the stack analysis service is configured to generate a graph for a group of stacks (e.g., the stacks in a stack file). In one example, the stack analysis service is configured to receive a stack file from each machine in a fleet of machines. In another example, the stack analysis service is configured to receive a single stack file from a predefined group of machines (e.g., two machines, three machines, ten machines).

The graph includes a plurality of entries where each entry represents a unique sequence of flows. The stack analysis service sequentially reads the stacks in a stack file (e.g., one by one). For the first stack sequentially read and/or for the first sequence of flows encountered, the stack analysis service adds an entry to the graph. Again, the entry represents the sequence of flows in the first stack that is sequentially read from the stack file. For each stack that is sequentially read from the stack file after the first stack, the stack analysis service uses the flow identifications to determine whether the sequence of flows included in the stack currently being sequentially read from the stack file (i.e., the "current" or "remaining" stack) matches a sequence of flows in a previous stack that has already been sequentially read from the stack file.

If the sequence of flows in the current stack matches the sequence of flows in the previous stack, meaning the graph already includes an entry for the matched sequence of flows, then the stack analysis service increments a weight value for the entry. The weight value represents a number of times the sequence of flows occurs in different stacks. If the sequence of flows in the current stack does not match the sequence of flows in the previous stack, meaning the graph does not yet include an entry for the sequence of flows in the current stack, then the stack analysis service adds a new entry to the graph.

The stack analysis service can additionally be configured to use a pointer from a flow identification (e.g., a flow node) in one entry of the graph to the same flow identification in a different entry in the graph. For example, in response to determining that the sequence of flows in the current stack does not match the sequence of flows in the previous stack, the stack analysis service looks in the existing entries of the graph for flow identifications that match flow identifications in the new entry added to the graph. In the event of a match, the stack analysis service adds a pointer from the flow in the new entry to the matching flow in an existing entry.

By representing the stacks of a stack file in a graph using a number of times each unique sequence of flows is encountered in the stacks, the deduplication of data is enabled. Further data deduplication occurs by using the pointers between matching flows in different entries. Consequently, a graph with the aforementioned weight values for each entry and/or the aforementioned pointers between matching flows in different entries allows for more efficient storage and/or more efficient transmission from one location (e.g., one server) to another location (e.g., another server).

When a graph is being stored for analysis (e.g., written to disk), the entries in the graph are ordered according to decreasing weight values. This ensures that entries that are seen more often in the stacks of a stack file (e.g., entries with the higher hit counts), and which are typically more important or significant from an analysis perspective, show up first when the graph is being read from disk. For instance, even when a small percentage of the data in the graph has been read, a clear picture of the performance of the fleet is apparent.

In various examples, a weight value threshold can be used to trim the graph. That is, the stack analysis service is configured to determine that a weight value for an entry in the graph fails to satisfy a weight value threshold (e.g., the weight value is below the weight value threshold). Based on this determination, the stack analysis service removes the entry from the graph. This can further improve the efficiency with regard to transmitting, storing, and/or processing the stack data in the graph because rarely encountered entries can be removed. Generally, the growth in the stack data (e.g., the increase in stacks) to be represented is driven by rarely occurring flow sequences (e.g., a flow sequence that occurs only one time). Without trimming these rarely occurring flow sequences, the amount of stack data to process and store can grow endlessly, at a large resource cost.

An additional benefit to using entry weights is that graphs (e.g., trimmed graphs) can be efficiently merged with one another. For example, weight values for matching entries in two graphs can be combined and represented in a merged graph. This merging can recursively occur as the collected stack data increases, and as a result of this recursive merging, one graph can represent a large number of stack files and/or stacks. Ultimately, this mitigates the need to maintain a database to store a large number of stacks and/or stack files. Instead, via the use of the graphs, the trimming of graphs, and/or the merging of graphs, the analysis of stacks can be scaled. For example, due to the space reductions and the removal of constraints, a graph for stacks collected from a fleet of customer machines can be placed in a customer allocated storage account.

In various examples, the graph can also include playback data. The playback data includes a timestamp associated with execution of a flow, as well as properties associated with the execution of the flow. Example properties include a process identification (PID) and/or a thread identification (TID). The timestamp and the properties can be used to replay the execution of flows at a particular machine.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

The techniques described herein implement an improved format for transmitting call stacks (referred to herein as stacks) from machines to a stack analysis service. Moreover, the techniques implement an improved way for the stack analysis service to represent the large number of stacks. The improved format enables the collection of a large number of stacks (e.g., millions or even trillions of stacks) to be more efficient. The improved representation of a large number of stacks enables the analysis to be more efficient. Consequently, the techniques described herein reduce the carbon footprint for an organization that operates a group of machines because less network, storage, and/or processing resources are needed to collect and analyze a large number of stacks. Various examples, scenarios, and aspects that enable the techniques described herein are described below with respect to FIGS. 1-9.

Figure 1:
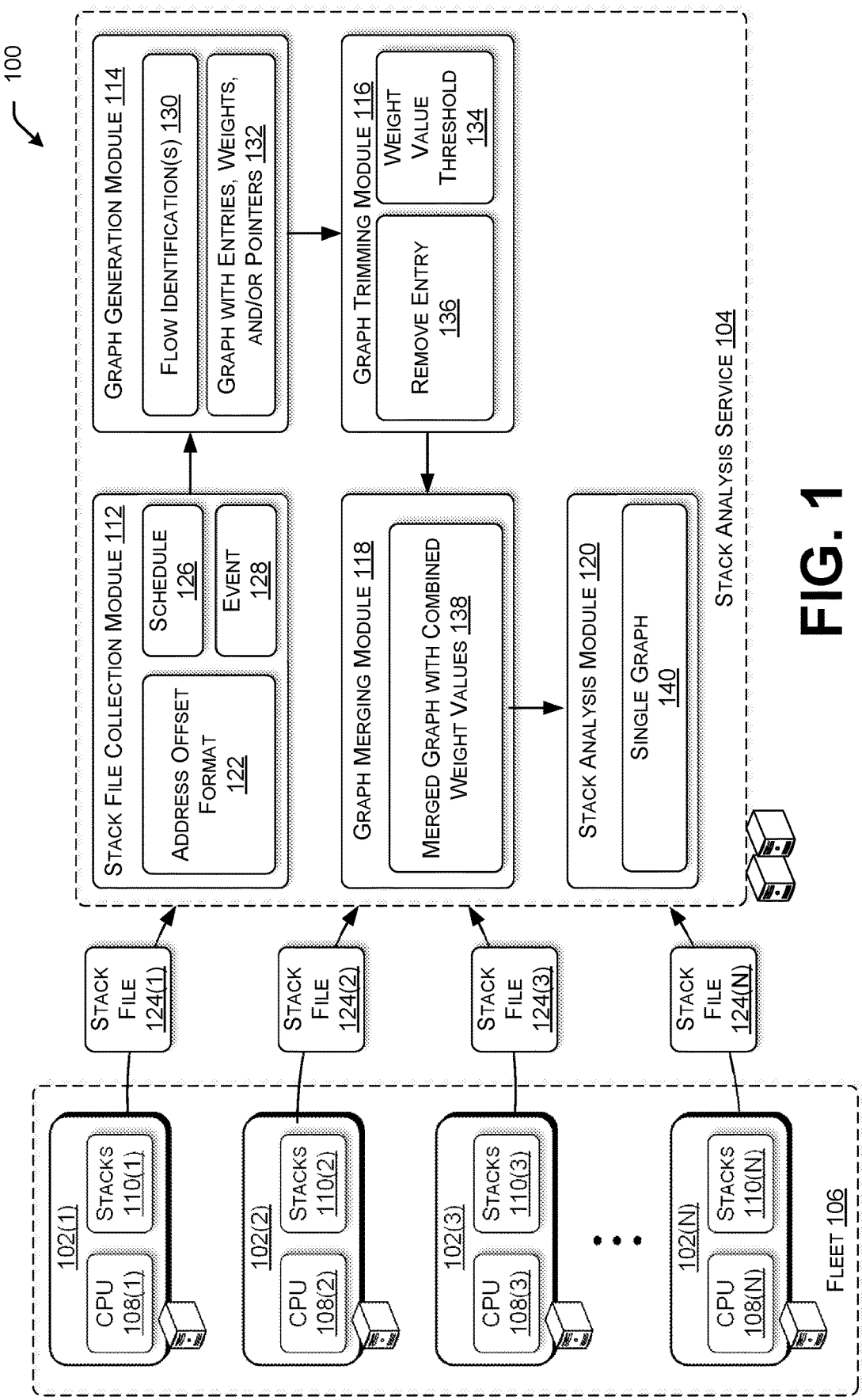
FIG. 1 illustrates an example environment in which machines implement an improved format for transmitting stacks to a stack analysis service and/or in which the stack analysis service can more efficiently represent a large number of stacks in a graph.

FIG. 1 illustrates an example environment 100 in which machines 102(1-N) implement an improved format for transmitting stacks to a stack analysis service 104 and/or in which the stack analysis service 104 can more efficiently represent a large number of stacks in a graph. As described above, the machines 102(1-N) can include servers or other types of machines (e.g., laptop devices, tablet devices, smartphone devices, Internet of Things (IoT) devices) that comprise a fleet 106 configured and/or operated by an organization (e.g., an operator of public cloud datacenters). The stack analysis service 104 can be executed, for example, on one or more servers.

Each machine 102(1-N) includes at least one central processing unit (CPU) 108(1-N). Each CPU 108(1-N) is configured to generate corresponding stacks 110(1-N) over a period of time (e.g., seconds, minutes, hours). A stack is a data structure that stores information about the flows of a computer program being executed by one of the CPUs 108(1-N). More specifically, a flow captures a call from one programming element (e.g., a subroutine, a function, a statement) to another programming element in the computer program. The flows added to the stacks 110(1-N) by the CPUs 108(1-N) include dedicated locations in memory (e.g., memory blocks). The dedicated locations are typically represented by a set of addresses (e.g., addresses "0000"-"9999"). Consequently, each of the stacks 110(1-N) includes a sequence of flows and a flow in the stack is represented by an address.

It can be beneficial for an operator of the fleet 106 to collect and analyze the stacks 110(1-N) for a particular purpose. For instance, the stack analysis service 104 can collect and analyze the stacks 110(1-N) to identify the most frequently used programming elements, to determine systemic costs with regard to modifying programming elements, to identify which programming elements use most of the processing time, to implement stack traces for debugging purposes, etc. To improve the way in which the stacks 110(1-N) are collected and represented for analysis, the stack analysis service 104 includes a stack file collection module 112, a graph generation module 114, a graph trimming module 116, a graph merging module 118, and a stack analysis module 120, each of which is discussed further herein. The functionality described herein in association with the illustrated modules may be performed by a fewer number of modules or a larger number of modules.

To improve the collection of the stacks 110(1-N), the stack file collection module 112 uses an address offset format 122 to represent the flows in a stack. The stack file collection module 112 pushes the address offset format 122 to the machines 102(1-N) in the fleet 106. The machines 102(1-N) are configured to locally generate stack files 124(1-N) that include the stacks 110(1-N) recently configured by the CPUs 108(1-N). A stack file includes at least one stack. The stack file collection module 112 can be configured to collect the stack files 124(1-N) in accordance with a schedule 126 (e.g., every hour, every two hours, once a day) established based on various factors. Additionally or alternatively, the stack file collection module 112 can be configured to collect the stack files 124(1-N) based on an occurrence of an event 128 (e.g., a system failure, a cyber-attack).

Prior to transmitting the stack files 124(1-N) to the stack analysis service 104, based on the schedule 126 and/or based on an occurrence of an event 128, the machines 102(1-N) are configured to generate and/or format the stacks 110(1-N) in the address offset format 122. The address offset format 122 employs an actual address to represent the first flow in the sequence of the stack. This actual address can be referred to as a baseline address for the stack. However, the address offset format 122 does not employ actual addresses to represent the flows in the sequence of the stack after the first flow. Rather, the address offset format 122 employs an address offset to represent each flow in the sequence after the first flow. The address offset is a difference between an address of a current flow and an address of a previous flow that calls on the current flow.

In various examples, the techniques further improve the efficiency with which stacks are transmitted by variable bit encoding the address offsets representing the flows in the stack. That is, the processing power used to prepare a stack for transmission is reduced by using variable bit encoding rather than conventional compression techniques (e.g., DEFLATE data compression, ZIP data compression), which require scanning previously seen data and finding duplicated parts of the data. Consequently, variable bit encoding the address offsets, rather than using entire addresses associated with machines, operating systems, and/or CPUs configured for sixty-four bit operation, allows for a lower processing cost to be realized, which is ideal in environments (e.g., datacenter operators, cloud providers) that are sensitive to power consumption and carbon footprints. An example of the technical improvements provided by the address offset format 122 and/or the variable bit encoding is provided in FIG. 2.

After the machines 102(1-N) locally prepare the stacks 110(1-N) for transmission, via the stack files 124(1-N), using the address offset format 122 and/or variable bit encoding, the stack file collection module 112 passes the stack files 124(1-N) to the graph generation module 114. The graph generation module 114 is configured to generate flow identifications 130 for each of the flows in a stack, as further described herein with respect to FIG. 2. Furthermore, the graph generation module 114 is configured to generate a graph that represents the stack in a manner that reduces the use of storage and processing resources. For example, the graph generation module 114 generates a graph 132 with entries, weights, and/or pointers for each stack file 124(1-N), as further described herein with respect to FIG. 3. A graph includes a plurality of entries where each entry represents a unique sequence of flows. Moreover, each entry in the graph includes a weight value that tracks the number of times the unique sequence of flows occurs in the stacks of a single stack file or multiple stack files. While FIG. 1 illustrates that a stack file 124(1-N) is collected from each machine 102 (1-N) in the fleet 106, a stack file can be collected from a predefined group of machines (e.g., two machines, three machines, ten machines).

By representing the stacks of a stack file in a graph 132 with entries, weights, and/or pointers, the deduplication of data is enabled. Consequently, the graph allows for more efficient storage and/or more efficient transmission from one location (e.g., one server) to another location (e.g., another server).

In various examples, a weight value threshold 134 can be used to trim the graph 132. That is, the graph trimming module 116 is configured to determine that a weight value for an entry in the graph 132 fails to satisfy the weight value threshold 134 (e.g., the weight value is below the weight value threshold). Based on this determination, the graph trimming module 116 removes the entry 136 from the graph, as described herein with respect to FIG. 4. This trimming can further improve the efficiency with regard to transmitting, storing, and/or processing the stack data in the graph because rarely encountered entries can be removed. Generally, the growth in the stack data (e.g., the increase in stacks) to be represented is driven by rarely occurring flow sequences (e.g., a flow sequence that occurs only one time). Without trimming these rarely occurring flow sequences, the amount of stack data to process and store can grow endlessly, at a large resource cost.

An additional benefit to using entry weights is that graphs (e.g., trimmed graphs) can be efficiently merged with one another. For example, provided two different graphs for two different stack files 124(1) and 124(2), the graph merging module 118 can take the weight values for a matching entry in the two different graphs and add them together to calculate a combined weight value for a merged graph 138. This merging can recursively occur as the collected stack data increases (e.g., more and more stack files 124(1-N) are received). As a result of this recursive merging, the graph merging module 118 can pass a single graph 140, that represents a large number of stacks 110(1-N) and/or stack files 124(1-N) to the stack analysis module 120. Alternatively, the graph merging module 118 can efficiently pass (e.g., transmit, communicate) the single graph to a different consumer (e.g., a user device, a client, a tenant, a customer). Ultimately, this mitigates the need to maintain a dedicated database for storing, processing, and managing the stacks 110(1-N) and/or stack files 124(1-N). Instead, via the use of the graphs, the trimming of graphs, and/or the merging of graphs, the analysis of stacks can be scaled.

Figure 2:
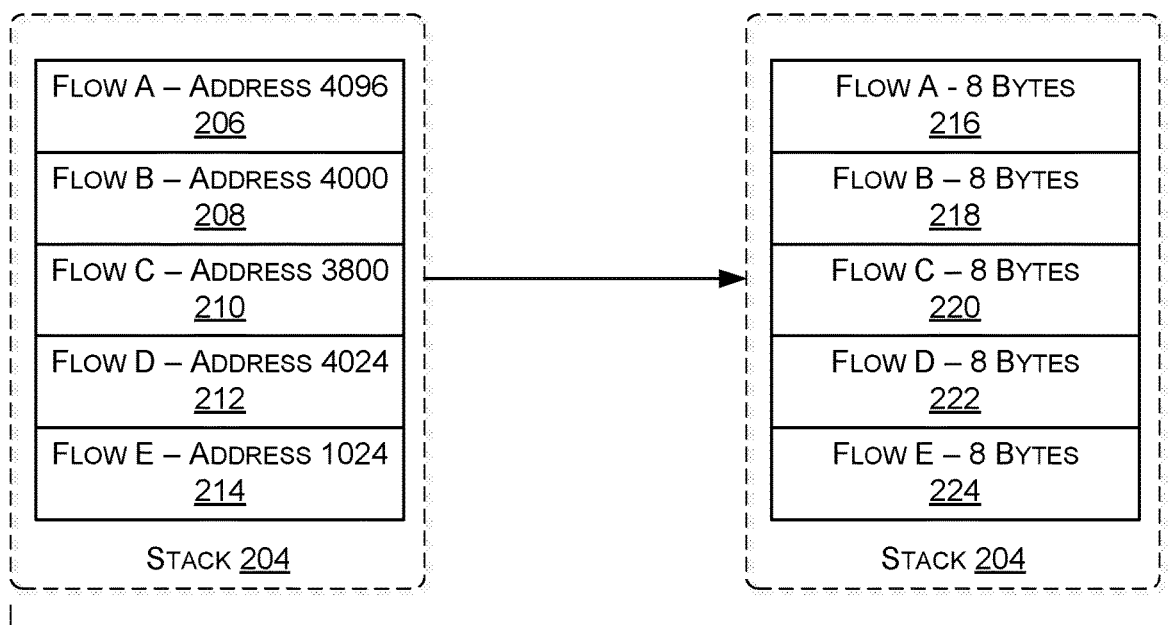
FIG. 2 illustrates an example diagram that captures the technical benefits of using an address offset format and/or variable bit encoding when transmitting stacks from a machine to the stack analysis service.
Figure 2:
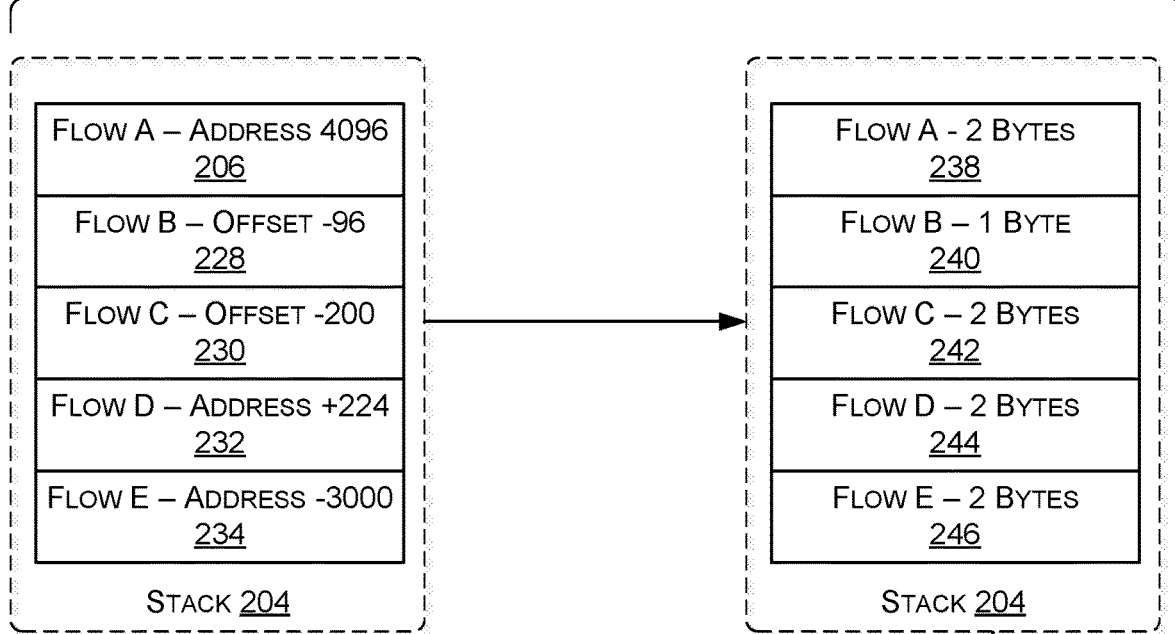

FIG. 2 illustrates an example diagram that captures the technical benefits of using an address offset format and/or variable bit encoding when transmitting stacks from a machine to a stack analysis service. As shown via the top half of FIG. 2, the conventional approach of using an actual address format 202 is used to transmit a stack 204. The stack 204 includes Flow A represented by address "4096" 206, Flow B represented by address "4000" 208, Flow C represented by address "3800" 210, Flow D represented by address "4024" 212, and Flow E represented by address "1024" 214.

When preparing the stack 204 for transmission, the actual addresses each use eight bytes of space when the machines 102(1-N) are sixty-four bit machines, as shown via elements 216, 218, 220, 222, and 224. Consequently, transmission of the stack 204 consumes forty bytes 226 when using the actual address format 202.

However, as described above, the compiler and/or CPU strive for high locality regarding storing flows that often call on one another. Consequently, the bottom half of FIG. 2 illustrates the technical benefits achieved by using an address offset format 122 to transmit the same stack 204. Using the address offset format 122, Flow A in the stack 204 is still represented by the baseline-address "4096" 206. However, Flow B is represented by the difference between address "4000" of the current flow and address "4096" of the previous flow, or "−96" 228. Flow C is represented by the difference between address "3800" of the current flow and address "4000" of the previous flow, or "−200" 230. Flow D is represented by the difference between address "4024" of the current flow and address "3800" of the previous flow, or "+224" 232. Flow E is represented by the difference between address "1024" of the current flow and address "4024" of the previous flow, or "−300" 234.

Note that when using the address offsets, one bit is used for indicating a positive or a negative difference or delta. When preparing the stack 204 for transmission via the use of variable bit encoding 236, the baseline address "4096" uses two bytes of space 238. The address offset "−96" uses one byte of space 240. The address offset "−200" uses two bytes of space 242. The address offset "+224" uses two bytes of space 244. And the address offset "−3000" uses two bytes of space 246. Consequently, transmission of the stack 204 using the address offset format 122 consumes nine bytes 248, which is a remarkable improvement compared to the forty bytes 226 used via the actual address format 202.

Figure 3A:
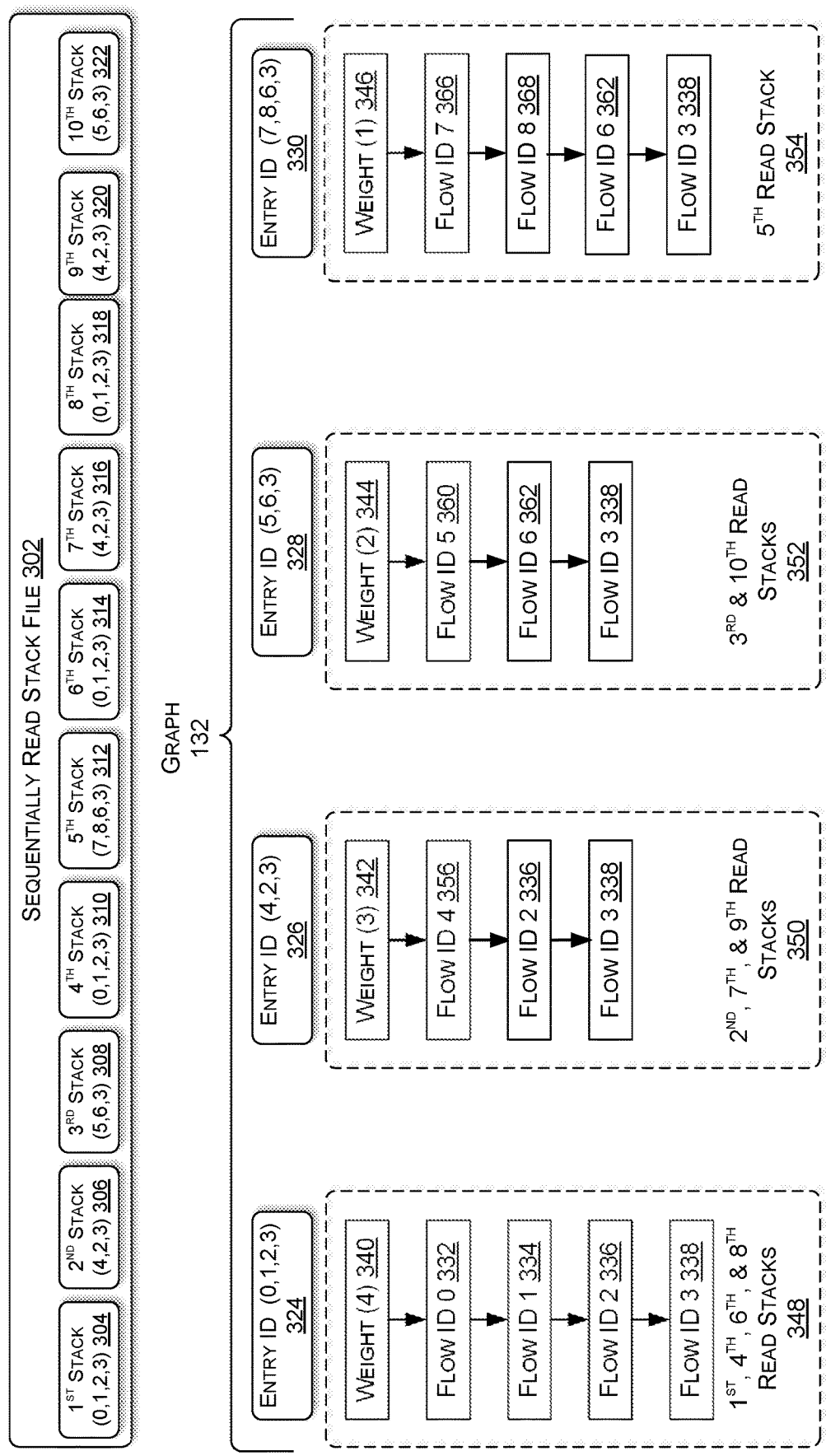
FIG. 3A illustrates an example diagram that captures the technical benefits of using the graph to represent the stacks with entries and/or entry weight values.

FIG. 3A illustrates an example diagram that captures the technical benefits of using a graph 132 that represents stacks with entries, entry weight values, and/or pointers. As described above, prior to generating the graph 132, the graph generation module 114 is configured to recalculate an address for each flow in a stack using the baseline address that represents the first flow and the address offsets that represent the flows after the first flow. The address serves as a flow identification (ID) (e.g., a node ID). For example, looking back to the example of FIG. 2, the graph generation module 114 uses the baseline address "4096" and the address offset "−96" to recalculate the address "4000" for Flow B 228. Further, the graph generation module 114 uses the recalculated address "4000" and the address offset "−200" to recalculate the address "3800" for Flow C 230. The addresses used to identify specific flows are consistent, or the same, across a fleet of machines 102(1-N), which enables the improved representation of a large number of stacks in the graph 132.

The graph generation module 114 is configured to sequentially read a stack file 302 (e.g., one stack at a time) when generating the graph 132. In the example of FIG. 3A, ten stacks 304, 306, 308, 310, 312, 314, 316, 318, 320, and 322 are in the stack file 302. As shown, the graph 132 includes a plurality of entries 324, 326, 328, 330, which are added based on stacks that are sequentially read. In this example, entry 324 is identified by the flow sequence (0, 1, 2, 3), entry 326 is identified by the flow sequence (4, 2, 3), entry 328 is identified by the flow sequence (5, 6, 3), and entry 330 is identified by the flow sequence (7, 8, 6, 3). Accordingly, each entry 324, 326, 328, 330 represents a unique sequence of flows.

For the first stack 304 sequentially read from the stack file 302, the graph generation module 114 adds an entry to the graph. Specifically, the first stack 304 includes a flow sequence (0, 1, 2, 3), and thus, entry 324 identified by the flow sequence (0, 1, 2, 3) is added to the graph 132. As shown, the entry 324 includes a node for flow ID 0 332, a node for flow ID 1 334, a node for flow ID 2 336, and a node for flow ID 3 338. The sequence of nodes matches the flow sequence (0, 1, 2, 3). Additionally, entry 324 identified by the flow sequence (0, 1, 2, 3) includes a weight 340. The weight 340 is a value that represents a number of times the same flow sequence is seen by the graph generation module 114. Accordingly, after reading out the first stack 304, the weight 340 is set to a value of one, but this value is incremented each time the same flow sequence (0, 1, 2, 3) is read out.

For each stack that is sequentially read from the stack file 302 after the first stack 304, the graph generation module 114 is configured to determine whether the flow sequence in the stack currently being sequentially read (i.e., the "current" or "remaining" stack) matches a flow sequence in a previous stack that has already been sequentially read. Stated alternatively, the graph generation module 114 is configured to determine if the flow sequence of the current stack matches a flow sequence of an entry that already exists in the graph 132. If the flow sequence in the current stack matches a flow sequence in a previous stack, then the graph generation module 114 increments a weight value for a corresponding entry. If the flow sequence in the current stack does not match the flow sequence in any previous stack, then the graph generation module 114 adds a new entry to the graph 132.

Back to the example of FIG. 3A, the graph generation module 114 reads the second stack 306 from the stack file 302 and determines that the flow sequence of (4, 2, 3) for the second stack 306 does not match the only existing entry 324 representing the flow sequence (0, 1, 2, 3). Accordingly, entry 326 identified by the flow sequence (4, 2, 3) is added to the graph 132 and its corresponding weight 342 is set to a value of one.

Next, the graph generation module 114 reads the third stack 308 from the stack file 302 and determines that the flow sequence of (5, 6, 3) for the third stack 308 neither matches the flow sequence of existing entry 324 nor the flow sequence of existing entry 326. Accordingly, entry 328 identified by the flow sequence (5, 6, 3) is added to the graph 132 and its corresponding weight 344 is set to a value of one.

Next, the graph generation module 114 reads the fourth stack 310 from the stack file 302 and determines that the flow sequence of (0, 1, 2, 3) for the fourth stack 310 matches the flow sequence of existing entry 324. Accordingly, the weight 340 for entry 324 is incremented from one to two.

Next, the graph generation module 114 reads the fifth stack 312 from the stack file 302 and determines that the flow sequence of (7, 8, 6, 3) for the fifth stack 312 neither matches the flow sequence of existing entry 324, the flow sequence of existing entry 326, nor the flow sequence of existing entry 328. Accordingly, entry 330 identified by the flow sequence (7, 8, 6, 3) is added to the graph 132 and its corresponding weight 346 is set to a value of one.

Next, the graph generation module 114 reads the sixth stack 314 from the stack file 302 and determines that the flow sequence of (0, 1, 2, 3) for the sixth stack 314 matches the flow sequence of existing entry 324. Accordingly, the weight 340 for entry 324 is incremented from two to three.

Next, the graph generation module 114 reads the seventh stack 316 from the stack file 302 and determines that the flow sequence of (4, 2, 3) for the seventh stack 316 matches the flow sequence of existing entry 326. Accordingly, the weight 342 for entry 326 is incremented from one to two.

Next, the graph generation module 114 reads the eighth stack 318 from the stack file 302 and determines that the flow sequence of (0, 1, 2, 3) for the eighth stack 318 matches the flow sequence of existing entry 324. Accordingly, the weight 340 for entry 324 is incremented from three to four—the final value for this example of FIG. 3, as illustrated.

Next, the graph generation module 114 reads the ninth stack 320 from the stack file 302 and determines that the flow sequence of (4, 2, 3) for the ninth stack 320 matches the flow sequence of existing entry 326. Accordingly, the weight 342 for entry 326 is incremented from two to three—the final value for this example of FIG. 3, as illustrated.

Finally, the graph generation module 114 reads the tenth stack 322 from the stack file 302 and determines that the flow sequence of (5, 6, 3) for the tenth stack 322 matches the flow sequence of existing entry 328. Accordingly, the weight 344 for entry 328 is incremented from one to two—the final value for this example of FIG. 3A, as illustrated.

Now that all the stacks from the stack file 302 have been sequentially read, the graph 132 shows that the first entry 324 represents the first, fourth, sixth, and eighth read stacks 348, so the value for the weight 340 is four. Further, the graph 132 shows that the second entry 326 represents the second, seventh, and ninth read stacks 350, so the value for the weight 342 is three. The graph 132 shows that the third entry 328 represents the third and tenth read stacks 352, so the value for the weight 344 is two. And the graph 132 shows that the fourth entry 330 represents the fifth read stack 354, so the value for the weight 346 is one.

Note that the number of stacks used in FIG. 3A (i.e., ten) is small and is used for ease of discussion. A stack file is likely to have many more stacks, and thus, a graph generated for the stack file is likely to have many more entries and larger weight values. When the graph generation module 114 stores the graph 132 for analysis (e.g., writes the graph 132 to disk), the entries 324, 326, 328, 330 in the graph 132 are ordered according to decreasing weight values, as shown in FIG. 3A. This ensures that entries that are seen more often in the stacks of a stack file (e.g., entries with the higher weight values or hit counts), and which are typically more important or significant from an analysis perspective, show up first when the graph 132 is being read from disk. For instance, even when a small percentage of the data in the graph has been read, a clear picture of the performance of the fleet is apparent.

Figure 3B:
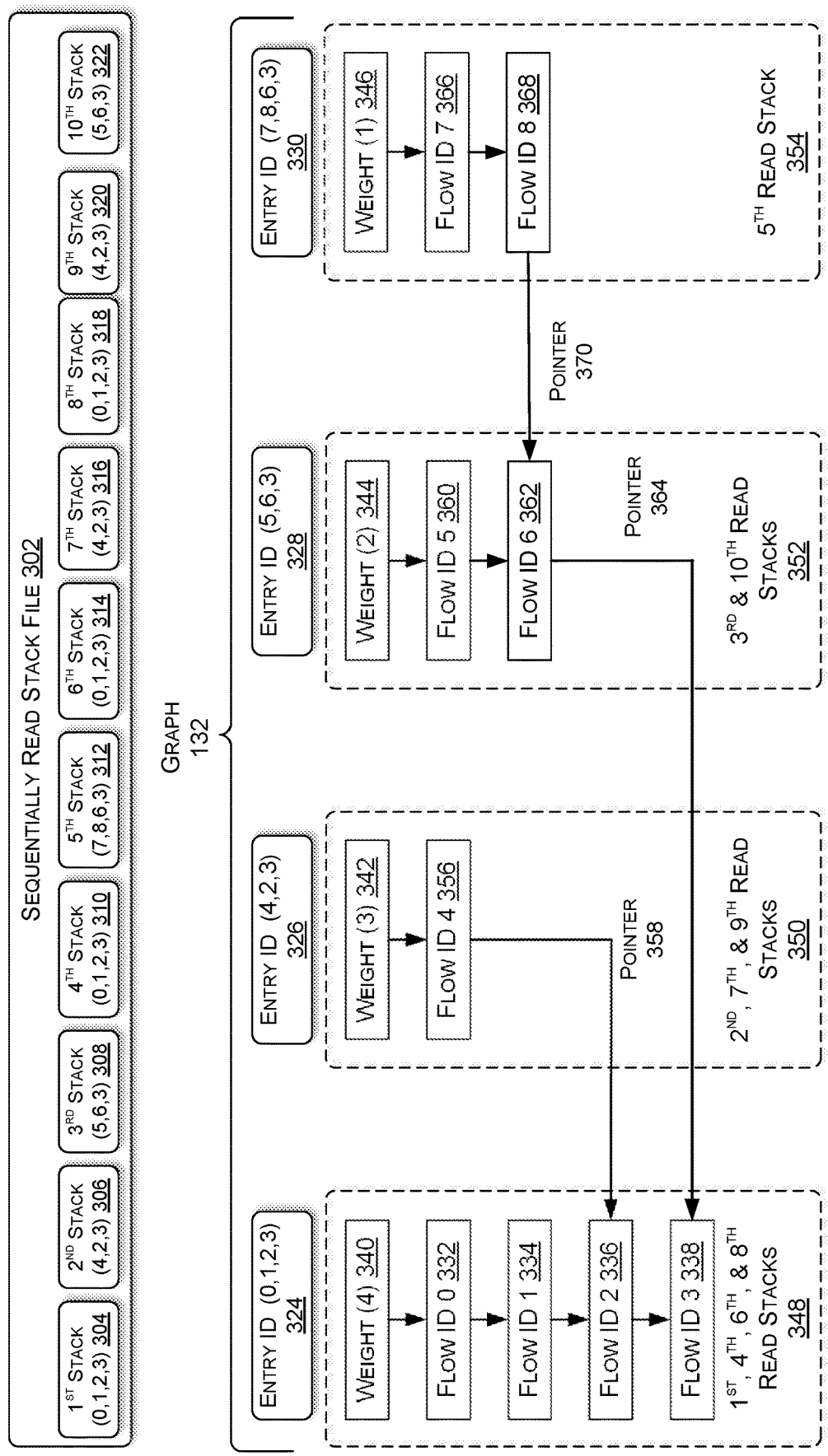
FIG. 3B illustrates an example diagram that captures the technical benefits of using the graph to represent the stacks with entries, entry weight values, and/or pointers.

The graph generation module 114 can additionally be configured to use a pointer from a flow identification (e.g., a flow node) in one entry of the graph to the same flow identification in a different entry in the graph. As shown in FIG. 3B, in response to determining that the flow sequence (4, 2, 3) for the second stack 306 read does not match the flow sequence (0, 1, 2, 3) for the first stack 304 already read, the graph generation module 114 looks in entry 324 for flow identifications that match flow identifications in the new entry 326 added to the graph. Since flow ID 4 does not have a match, a node 356 is added to entry 326. However, the subsequent sequence of flow ID 2 and flow ID 3 is the same in entry 324. Consequently, to further conserve space when representing the stacks in the graph, the graph generation module 114 adds a pointer 358 from the node 356 representing flow ID 4 to the node 336 representing flow ID 2 in entry 324. The flow sequence (4, 2, 3) is still intact via the pointer 358.

Similarly, in response to determining that the flow sequence (5, 6, 3) for the third stack 308 neither matches the flow sequence (0, 1, 2, 3) for the first stack 304 nor the flow sequence (4, 2, 3) for the second stack 306, the graph generation module 114 looks in entry 324 and entry 326 for flow identifications that match flow identifications in the new entry 328 added to the graph. Since flow ID 5 and flow ID 6 do not have a match, nodes 360 and 362 are added to entry 328. However, the subsequent flow ID 3 has a match in entry 324. Consequently, to further conserve space when representing the stacks in the graph, the graph generation module 114 adds a pointer 364 from the node 362 representing flow ID 6 to the node 338 representing flow ID 3 in entry 324. The flow sequence (5, 6, 3) is still intact via the pointer 364.

In another example, in response to determining that the flow sequence (7, 8, 6, 3) for the fifth stack 312 does not match the flow sequences that have already been read, the graph generation module 114 looks in entry 324, entry 326, and entry 328 for flow identifications that match flow identifications in the new entry 330 added to the graph. Since flow ID 7 and flow ID 8 do not have a match, nodes 366 and 368 are added to entry 330. However, the subsequent flow ID 6 has a match in entry 328 that represent the same flow—flow ID 6. Consequently, to further conserve space when representing the stacks in the graph, the graph generation module 114 adds a pointer 370 from the node 368 representing flow ID 8 to the node 362 representing flow ID 6 in entry 328. Thus, the flow sequence (7, 8, 6, 3) is still intact via the pointer 370 and the pointer 364.

Figure 4:
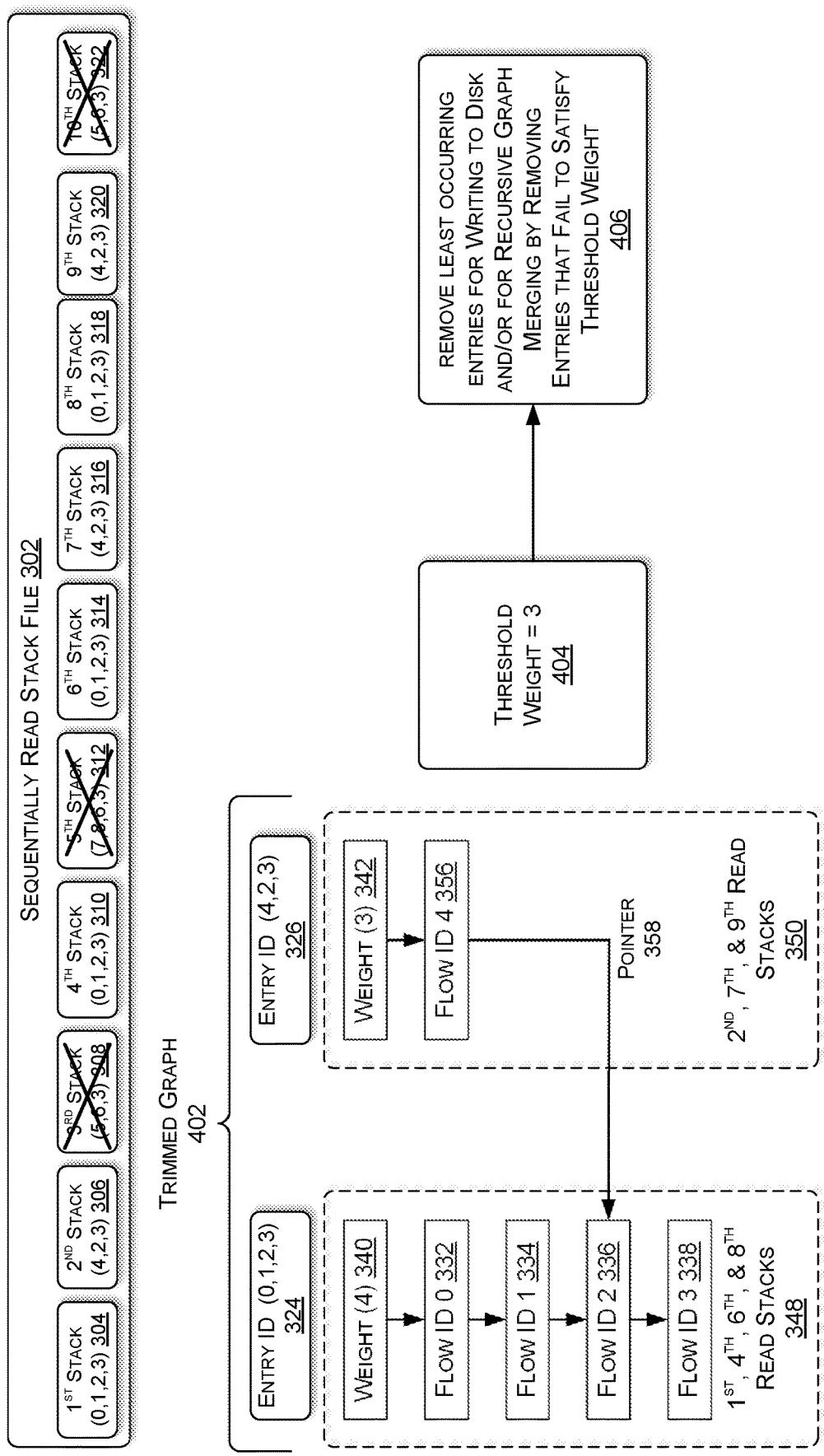
FIG. 4 illustrates an example diagram that trims the graph representing the stacks with entries, entry weight values, and/or pointers.

FIG. 4 illustrates an example diagram that trims a graph that represents stacks with entries, entry weight values, and/or pointers. The diagram in FIG. 4 is based on the diagram in FIG. 3, except that the graph is now a trimmed graph 402. The graph trimming module 116 uses the weight value threshold 134 to trim the graph 132. In the example of FIG. 4, the weight value threshold is equal to three 404. The weight value threshold 134 can be established based on various factors, such as a number of stacks, a number of entries, etc. Moreover, the weight value threshold 134 can be learned over time and adjusted to accommodate different analysis scenarios.

In FIG. 4, the graph trimming module 116 determines that entries 324 and 326 have weight values 340 and 342 that satisfy the weight value threshold of three 404 (e.g., the weight values of four 340 and three 342 are greater than or equal to the weight value threshold of three). In contrast, the graph trimming module 116 determines that entries 328 and 330 have weight values 344 and 346 that fail to satisfy the weight value threshold of three 404 (e.g., the weight values of two 344 and one 346 are less than the weight value threshold of three). Accordingly, entries 328 and 330 are not shown in the trimmed graph 402 of FIG. 4. In other words, entries 328 and 330 are removed from the graph 406. Thus, stacks 308, 312, and 322 are no longer represented in the trimmed graph 402, as captured by the "X" through these stacks in the stack file 302 in FIG. 4.

As described above, this trimming and/or removal can further improve the efficiency with regard to transmitting, storing, and/or processing the stack data in the graph because the removed entries are likely insignificant and/or meaningless from an analysis perspective.

Figure 5A:
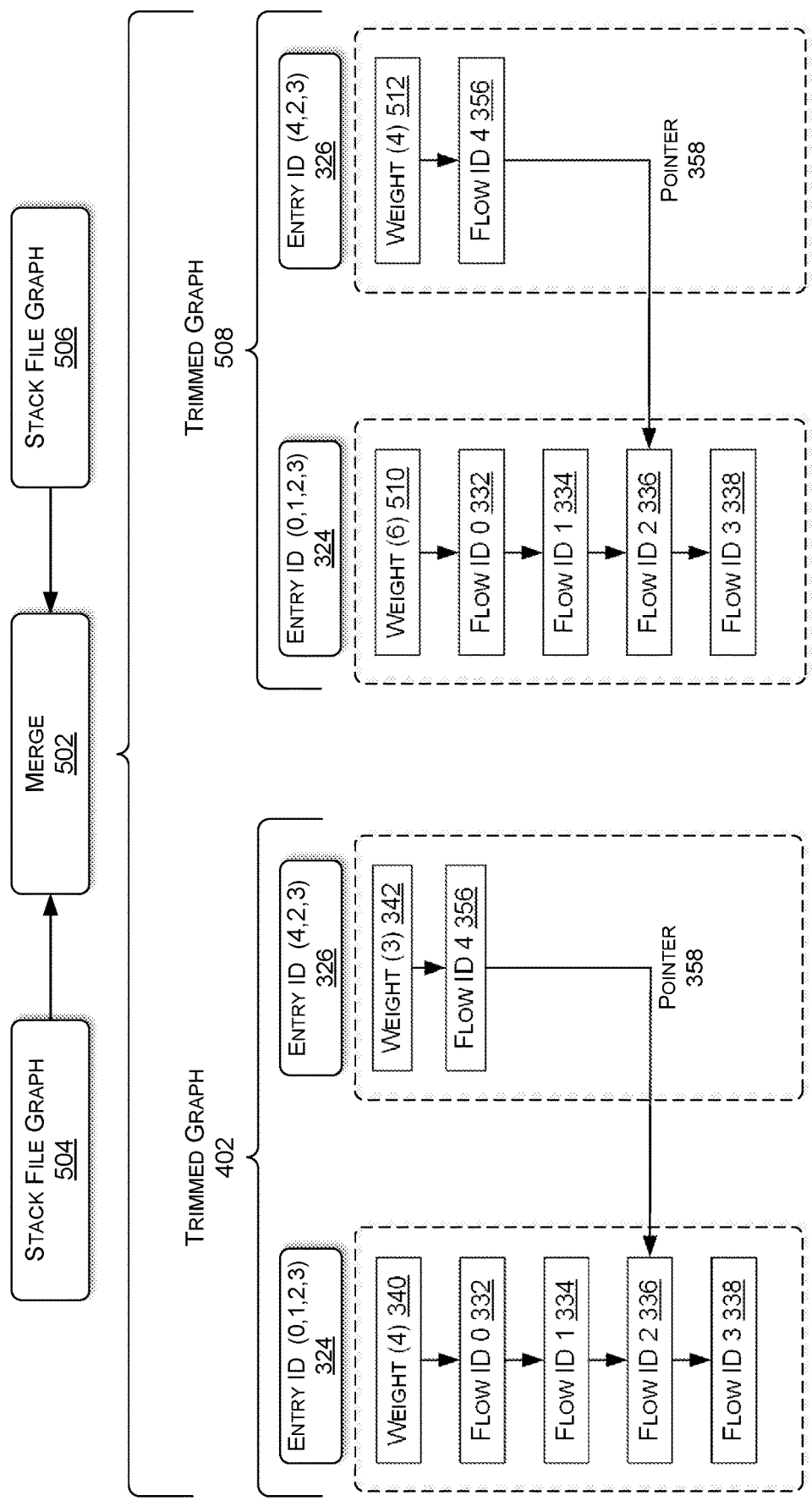
FIG. 5A illustrates an example diagram directed to merging two trimmed graphs.

An additional benefit to using entry weights is that graphs (e.g., trimmed graphs) can be efficiently merged with one another. FIG. 5A illustrates an example diagram directed to merging 502 two graphs 504, 506. For example, a first graph 504 may be generated based on stack file 124(1) and a second graph 506 may be generated based on stack file 124(2). In FIG. 5A, the first graph 504 comprises the trimmed graph 402 from FIG. 4, and the second graph 506 comprises another trimmed graph 508. As illustrated, trimmed graph 402 and trimmed graph 508 include common entries 324 and 326, which include the same unique flows, and thus, the same nodes and 332, 334, 336, 338, 356 and the same pointer 358. Note that the trimmed graph 402 likely includes entries not included in trimmed graph, and vice versa, but this is not illustrated.

The difference between trimmed graph 402 and trimmed graph 508 is the weight values. Trimmed graph 402 includes a weight value 340 of four for entry 324, while trimmed graph 508 includes a weight value 510 of six for entry 324. Further, trimmed graph 402 includes a weight value 342 of three for entry 326, while trimmed graph 508 includes a weight value 512 of four for entry 326.

Figure 5B:
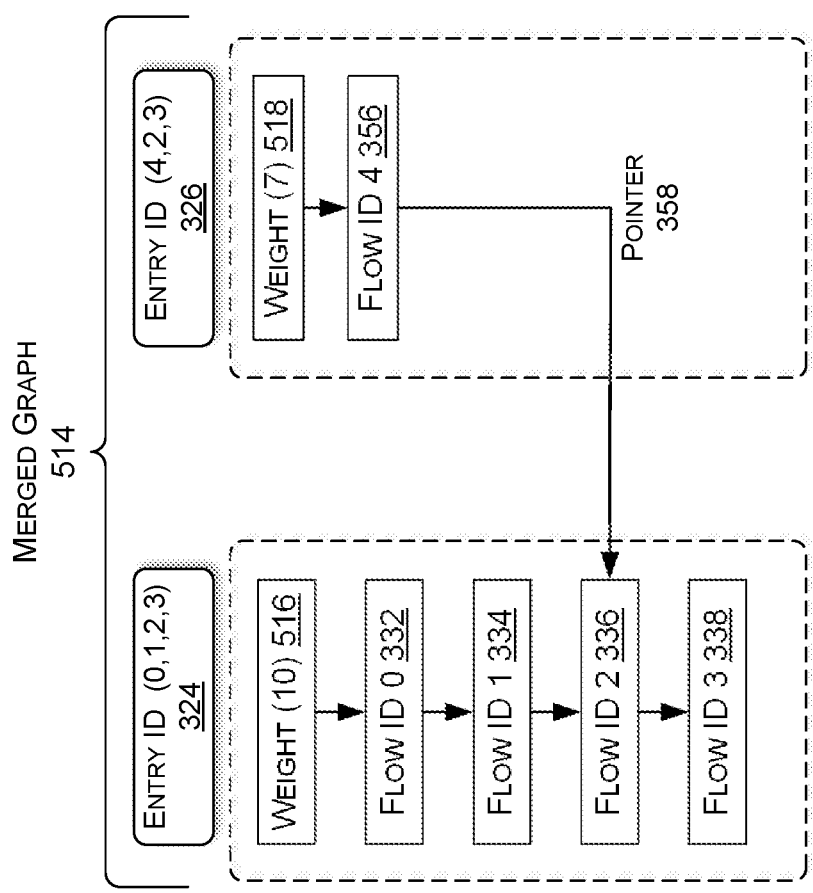
FIG. 5B illustrates an example diagram that shows the merged graph, after the merging of the two trimmed graphs of FIG. 5A.

The graph merging module 118 is configured to combine the weight values for common or matching entries, from multiple graphs. As shown in FIG. 5B, a merged graph 514 includes a combined weight value 516 of ten for entry 324 and a combined weight value 518 of seven for entry 326.

The merging, an example of which is illustrated in FIGS. 5A-5B, can recursively occur as the collected stack data increases (e.g. more stack files 124(1-N) are received), and as a result of this recursive merging, one graph can represent a large number of stack files and/or stacks. Ultimately, this mitigates the need to maintain a database to store a large number of stacks and/or stack files. Instead, via the use of the graphs, the trimming of graphs, and/or the merging of graphs, the analysis of stacks can be scaled. For example, due to the space reductions and the removal of constraints, a graph for stacks collected from a fleet of customer machines can be placed in a customer allocated storage account.

The graphs can be merged together in accordance with various schedules, which enables the containment of stack permutations. For example, graphs can merge each twenty-four-hour window of time per-service in the fleet. Moreover, as the merging increases (e.g., more stack files and/or stacks are represented in a single graph), the weight value threshold used to trim the graphs can increase.

Figure 6:
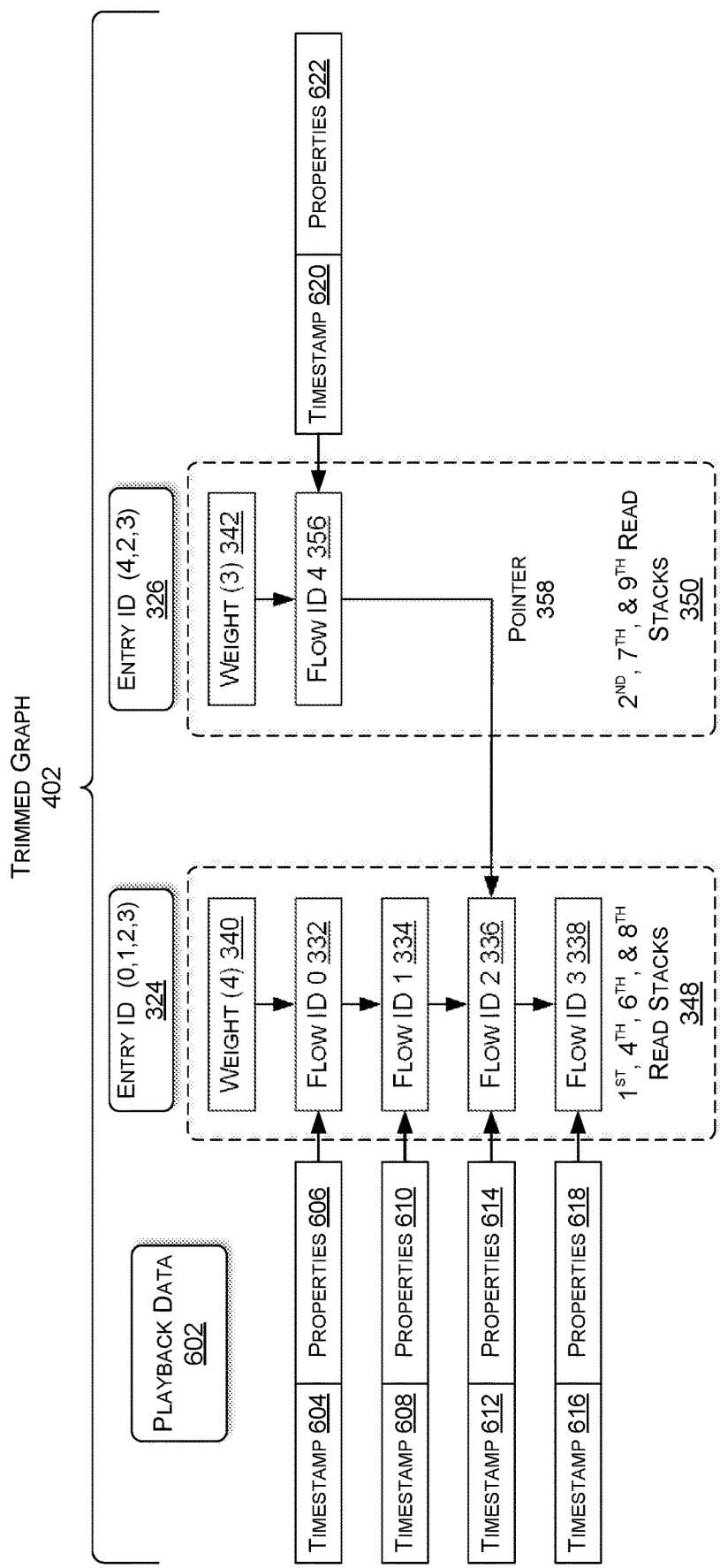
FIG. 6 illustrates an example diagram in which playback data is associated with each node in the graph.

FIG. 6 illustrates an example diagram in which playback data is associated with each node in a graph. FIG. 6 illustrates the trimmed graph from FIG. 4, where each node 332, 334, 336, 338, and 356 includes playback data 602.

The playback data 602 includes a timestamp associated with execution of a flow, as well as properties associated with the execution of the flow. Example properties include a process identification (PID) and/or a thread identification (TID). The timestamp and the properties can be used to replay the execution of flows at a particular machine. In various examples, the playback data 602 is stored and read from a different location in the graph. Each playback data entry points to a node in the graph.

For example, for each time that flow ID 0 332 is executed (e.g., at least four times in this example), a timestamp 604 and properties 606 are registered. Similarly, for each time that flow ID 1 334 is executed (e.g., at least four times in this example), a timestamp 608 and properties 610 are registered. For each time that flow ID 2 336 is executed (e.g., at least seven times in this example), a timestamp 612 and properties 614 are registered. For each time that flow ID 3 338 is executed (e.g., at least seven times in this example), a timestamp 616 and properties 618 are registered. And, for each time that flow ID 4 356 is executed (e.g., at least three times in this example), a timestamp 620 and properties 622 are registered.

Figure 7:
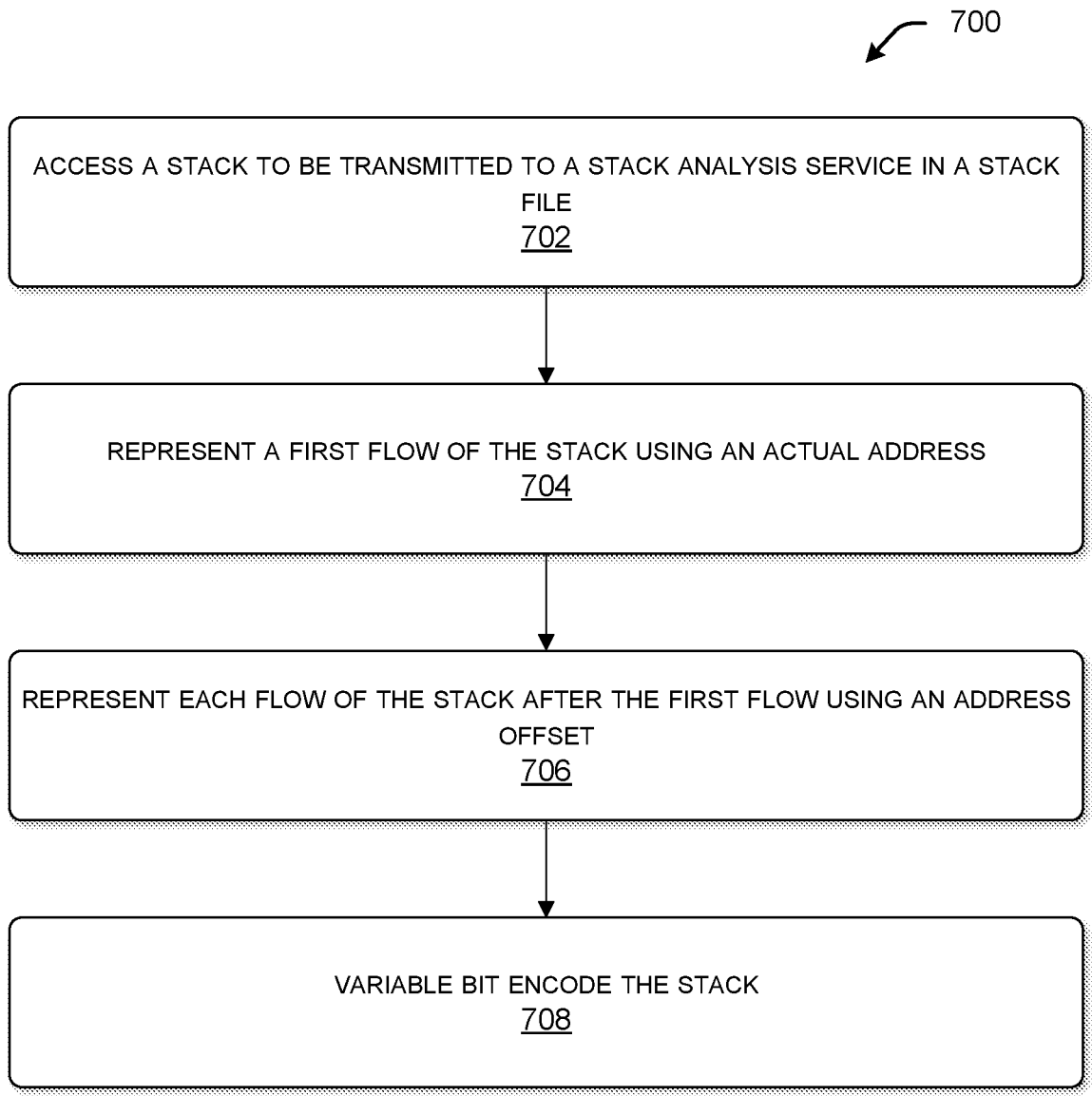
FIG. 7 is an example flow diagram showing aspects of a method implemented by a machine to represent a stack using a format that includes address offsets.

Turning now to FIG. 7, aspects of a method 700 implemented by a machine are described. At operation 702, the machine accesses a stack to be transmitted to a stack analysis service. At operation 704, the machine represents the first flow of the stack using an actual address. At operation 706, the machine represents each flow of the stack after the first flow using an address offset. At operation 708, the machine variable bit encodes the stack for transmission.

Figure 8:
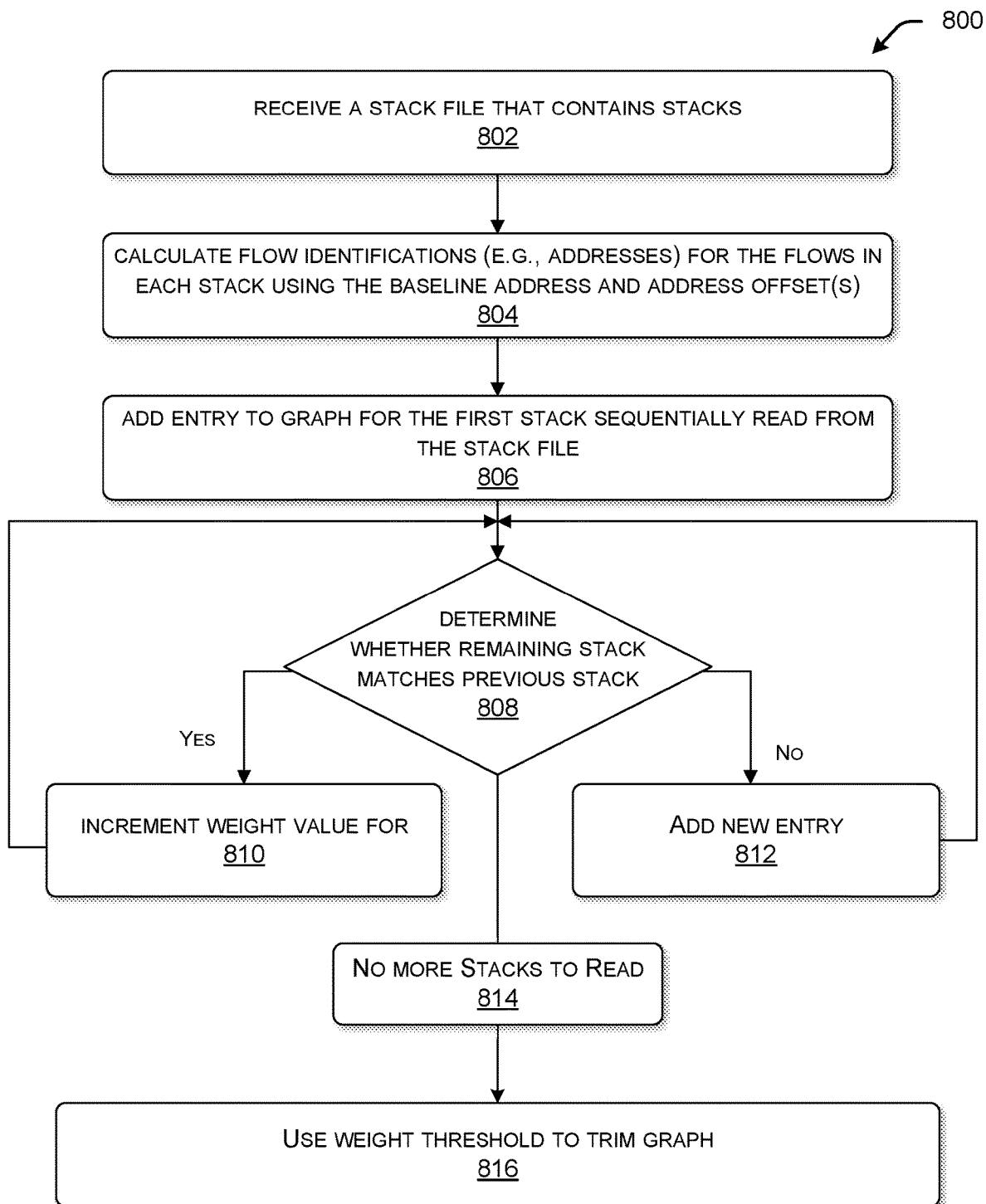
FIG. 8 is an example flow diagram showing aspects of a method implemented by a stack analysis service to generate the graph representing stacks in a stack file.

FIG. 8 is an example flow diagram showing aspects of a method 800 implemented by a stack analysis service to generate a graph that represent stacks in a stack file. At operation 802, the stack analysis service receives a stack file that contains stacks. At operation 804, the stack analysis service calculates flow (e.g., node) identifications (e.g., addresses) for the flows in each stack using the baseline address and the address offset(s). At operation 806, the stack analysis service adds an entry to a graph for the first stack sequentially read from the stack file.

At operation 808, the stack analysis service determines whether a remaining stack (e.g., a current stack being read) matches a previous stack. If the determination at operation 808 is yes (i.e., the remaining stack matches the previous stack, and thus, an entry for the remaining stack already exists in the graph), then at operation 810 a corresponding weight value for the entry associated with the remaining stack and the previous stack is incremented. The process then returns to operation 808 for the next stack to be read. If the determination at operation 808 is no (i.e., the remaining stack does not match any previous stack, and thus, an entry for the remaining stack does not already exists in the graph), then at operation 812 a new entry is added to the graph. The process then returns to operation 808 for the next stack to be read. When there are no more stacks to in the stack file to evaluate with regard to operation 808, as captured by 814, the stack analysis service proceeds to use a weight value threshold to trim the graph at operation 816.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein may be referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

Figure 9:
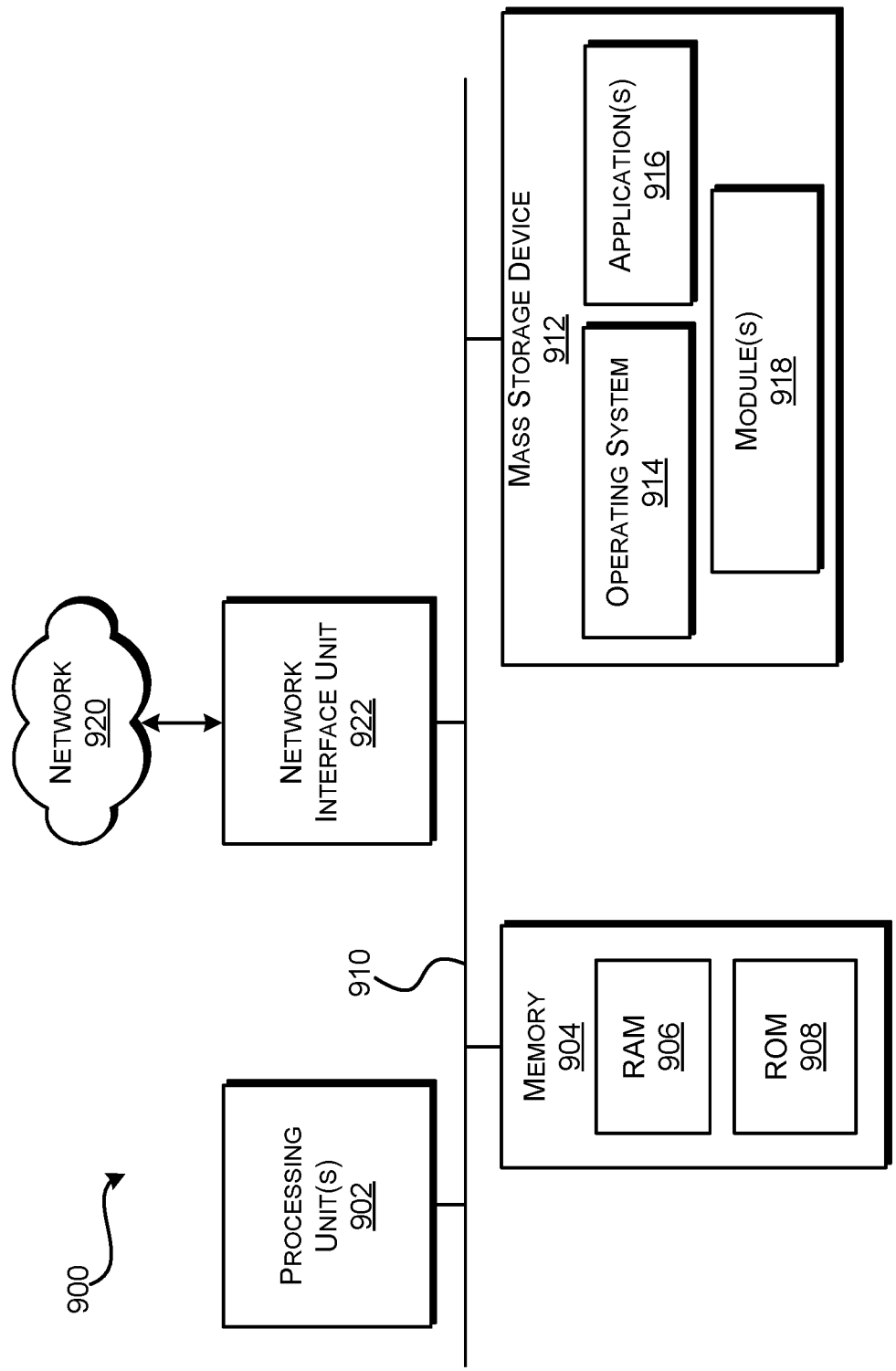
FIG. 9 is a computer architecture diagram showing an illustrative computer hardware and software architecture for a computing system capable of implementing aspects of the techniques and technologies presented herein.

FIG. 9 shows additional details of an example computer architecture 900 for a device, such as a computer or a server capable of executing computer instructions (e.g., a component described herein). The computer architecture 900 illustrated in FIG. 9 includes processing unit(s) 902, a system memory 904, including a random-access memory 906 (RAM) and a read-only memory (ROM) 908, and a system bus 910 that couples the memory 904 to the processing unit(s) 902. The processing units 902 may also comprise or be part of a processing system. In various examples, the processing units 902 of the processing system are distributed. Stated another way, one processing unit 902 of the processing system may be located in a first location (e.g., a rack within a datacenter) while another processing unit 902 of the processing system is located in a second location separate from the first location.

Processing unit(s), such as processing unit(s) 902, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 900, such as during startup, is stored in the ROM 908. The computer architecture 900 further includes a mass storage device 912 for storing an operating system 914, application(s) 916, modules 918, and other data described herein.

The mass storage device 912 is connected to processing unit(s) 902 through a mass storage controller connected to the bus 910. The mass storage device 912 and its associated computer-readable media provide non-volatile storage for the computer architecture 900. Although the description of computer-readable media contained herein refers to a mass storage device, it should be appreciated by those skilled in the art that computer-readable media can be any available computer-readable storage media or communication media that can be accessed by the computer architecture 900.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 900 may operate in a networked environment using logical connections to remote computers through the network 920. The computer architecture 900 may connect to the network 920 through a network interface unit 922 connected to the bus 910.

It should be appreciated that the software components described herein may, when loaded into the processing unit(s) 902 and executed, transform the processing unit(s) 902 and the overall computer architecture 900 from a general-purpose computing system into a special-purpose computing system customized to facilitate the functionality presented herein. The processing unit(s) 902 may be constructed from any number of transistors or other discrete circuit elements, which may individually or collectively assume any number of states. More specifically, the processing unit(s) 902 may operate as a finite-state machine, in response to executable instructions contained within the software modules disclosed herein. These computer-executable instructions may transform the processing unit(s) 902 by specifying how the processing unit(s) 902 transition between states, thereby transforming the transistors or other discrete hardware elements constituting the processing unit(s) 902.

The disclosure presented herein also encompasses the subject matter set forth in the following clauses.

Example Clause A, a method comprising: receiving a stack file that includes a plurality of stacks, wherein each stack in the plurality of stacks includes a sequence of flows; generating a graph for the stack file by sequentially reading the plurality of stacks from the stack file, the graph including a plurality of entries and each entry of the plurality of entries represents a unique sequence of flows, wherein the generating the graph includes: adding a first entry to the graph, the first entry representing the sequence of flows in a first stack of the plurality of stacks; for a remaining stack of the plurality of stacks after the first stack: determining that a particular sequence of flows included in the remaining stack of the plurality of stacks matches a previous sequence of flows included in a previous stack of the plurality of stacks; and based on the determining that the particular sequence of flows included in the remaining stack matches the previous sequence of flows included in the previous stack, incrementing, for a corresponding entry included in the graph, a corresponding weight value that represents a number of times the previous sequence of flows occurs in the plurality of stacks; determining that a weight value for a particular entry of the plurality of entries fails to satisfy a weight value threshold; and removing the particular entry from the graph based on the determining that the weight value for the particular entry fails to satisfy the weight value threshold.

Example Clause B, the method of Example Clause A, wherein removing the particular entry from the graph produces a trimmed graph, the method further comprising writing remaining entries of the trimmed graph to memory in order of decreasing weight values.

Example Clause C, the method of Example Clause A or Example Clause B, further comprising merging the graph with another graph by combining the weight values for matching entries.

Example Clause D, the method of any one of Example Clauses A through C, wherein: each stack of the plurality of stacks is received in a format that represents a first flow in the sequence of flows using an address and each flow in the sequence of flows after the first flow uses an address offset from a previous flow in the sequence of flows; and the method further comprises: recalculating an address for each flow in the sequence of flows using the address that represents the first flow and at least one address offset that represents each flow after the first flow; and using the address for each flow as a flow identification in the graph.

Example Clause E, the method of Example Clause D, wherein the format variable bit encodes the address and the address offset.

Example Clause F, the method of any one of Example Clauses A through E, wherein the graph includes playback data that includes a timestamp for each time a flow is executed and that identifies a thread identification or a process identification associated with each time the flow is executed.

Example Clause G, a method comprising: receiving a stack file that includes a plurality of stacks, wherein each stack in the plurality of stacks includes a sequence of flows; generating a graph for the stack file by sequentially reading the plurality of stacks from the stack file, the graph including a plurality of entries and each entry of the plurality of entries represents a unique sequence of flows, wherein the generating the graph includes: adding a first entry to the graph, the first entry representing the sequence of flows in a first stack of the plurality of stacks; for a remaining stack of the plurality of stacks after the first stack: determining that a particular sequence of flows included in the remaining stack of the plurality of stacks does not match a previous sequence of flows included in a previous stack of the plurality of stacks; and based on the determining that the particular sequence of flows included in the remaining stack does not match the previous sequence of flows included in the previous stack of, adding a new entry to the graph; determining that a weight value for a particular entry of the plurality of entries included in the graph fails to satisfy a weight value threshold; and removing the particular entry from the graph based on the determining that the weight value for the particular entry fails to satisfy the weight value threshold.

Example Clause H, the method of Example Clause G, wherein removing the particular entry from the graph produces a trimmed graph, the method further comprising writing remaining entries of the trimmed graph to memory in order of decreasing weight values.

Example Clause I, the method of Example Clause G or Example Clause H, further comprising merging the graph with another graph by combining the weight values for matching entries.

Example Clause J, the method of any one of Example Clauses G through I, wherein: each stack of the plurality of stacks is received in a format that represents a first flow in the sequence of flows using an address and each flow in the sequence of flows after the first flow uses an address offset from a previous flow in the sequence of flows; and the method further comprises: recalculating an address for each flow in the sequence of flows using the address that represents the first flow and at least one address offset that represents each flow after the first flow; and using the address for each flow as a flow identification in the graph.

Example Clause K, the method of Example Clause J, wherein the format variable bit encodes the address and the address offset.

Example Clause L, the method of any one of Example Clauses G through K, further comprising: based on the determining that the particular sequence of flows included in the remaining stack does not match the previous sequence of flows included in the previous stack, determining that a remaining flow identification included in the remaining stack matches a previous flow identification included in the previous stack; and adding a pointer from the new entry to an existing entry that includes the previous flow identification.

Example Clause M, the method of any one of Example Clauses G through L, wherein the graph includes playback data that includes a timestamp for each time a flow is executed and that identifies a thread identification or a process identification associated with each time the flow is executed.

Example Clause N, a system comprising: a processing system; and computer-readable storage media storing instructions that, when executed by the processing system, cause the system to: generate a graph for a stack file that includes a plurality of stacks by sequentially reading the plurality of stacks from the stack file, wherein: each stack in the plurality of stacks includes a sequence of flows; the graph includes a plurality of entries; and each entry of the plurality of entries represents a unique sequence of flows and includes a weight value that represents a number of times the unique sequence of flows occurs in the stack file; determine that a weight value for an entry of the plurality of entries fails to satisfy a weight value threshold; and remove the entry from the graph based on the determining that the weight value for the entry fails to satisfy the weight value threshold.

Example Clause O, the system of Example Clause N, wherein removing the entry from the graph produces a trimmed graph, and the instructions further cause the system to write remaining entries of the trimmed graph to memory in an order of decreasing weight values.

Example Clause P, the system of Example Clause N or Example Clause O, wherein the instructions further cause the system to merge the graph with another graph by reading and combining the weight values for the entries.

Example Clause Q, the system of any one of Example Clauses N through P, wherein: each stack of the plurality of stacks is received in a format that represents a first flow in the sequence of flows using an address and each flow in the sequence of flows after the first flow uses an address offset from a previous flow in the sequence of flows; and the instructions further cause the system to: recalculate an address for each flow in the sequence of flows using the address that represents the first flow and at least one address offset that represents each flow after the first flow; and use the address for each flow as a flow identification in the graph.

Example Clause R, the system of Example Clause Q, wherein the format variable bit encodes the address and the address offset.

Example Clause S, the system of any one of Example Clauses N through R, wherein the graph includes playback data that includes a timestamp for each time a flow is executed and that identifies a thread identification or a process identification associated with each time the flow is executed.

Example Clause T, the system of any one of Example Clauses N through S, wherein the instructions further cause the system to receive the stack file from a machine.

While certain example embodiments have been described, these embodiments have been presented by way of example only, and are not intended to limit the scope of the inventions disclosed herein. Thus, nothing in the foregoing description is intended to imply that any particular feature, characteristic, step, component, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different stacks)

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:
   receiving a stack file that includes a plurality of stacks, wherein each stack of the plurality of stacks includes a sequence of flows being executed;
   generating a graph for the stack file by sequentially accessing and reading the plurality of stacks from the stack file, wherein the graph includes a plurality of entries and each entry of the plurality of entries represents a unique sequence of flows, and wherein generating the graph includes:
      adding a first entry of the plurality of entries to the graph, wherein the first entry of the plurality of entries represents the sequence of flows in a first stack of the plurality of stacks;
      for a remaining stack of the plurality of stacks after the first stack of the plurality of stacks:
         determining that a particular sequence of flows included in the remaining stack of the plurality of stacks matches a previous sequence of flows included in a previous stack of the plurality of stacks; and
         based on the determining that the particular sequence of flows included in the remaining stack of the plurality of stacks matches the previous sequence of flows included in the previous stack of the plurality of stacks, incrementing, for a corresponding entry of the plurality of entries included in the graph, a corresponding weight value that represents a number of times the previous sequence of flows occurs in the plurality of stacks;
   determining that a weight value for a particular entry of the plurality of entries included in the graph fails to satisfy a weight value threshold; and
   removing the particular entry of the plurality of entries from the graph based on the determining that the weight value for the particular entry of the plurality of entries fails to satisfy the weight value threshold.

2. The method of claim 1, wherein removing the particular entry of the plurality of entries from the graph produces a trimmed graph, the method further comprising writing remaining entries of the trimmed graph to a memory in an order of decreasing weight values.

3. The method of claim 1, further comprising merging the graph with another graph by reading and combining weight values for matching entries.

4. The method of claim 1, wherein:
   each stack of the plurality of stacks is received in a format that represents a first flow in the sequence of flows using an address and each flow in the sequence of flows after the first flow in the sequence of flows uses an address offset from a previous flow in the sequence of flows; and
   the method further comprises:
      recalculating an address for each flow in the sequence of flows using the address that represents the first flow in the sequence of flows and at least one address offset that represents each flow in the sequence of flows after the first flow in the sequence of flows; and
      using the address for each flow in the sequence of flows as a flow identification in the graph.

5. The method of claim 4, wherein the address and the address offset are encoded using variable bit encoding.

6. The method of claim 1, wherein the graph includes playback data that includes a timestamp for each time a flow is executed and that identifies a thread identification or a process identification associated with each time the flow is executed.

7. A method comprising:
   receiving a stack file that includes a plurality of stacks, wherein each stack of the plurality of stacks includes a sequence of flows being executed;
   generating a graph for the stack file by sequentially accessing and reading the plurality of stacks from the stack file, wherein the graph includes a plurality of entries and each entry of the plurality of entries represents a unique sequence of flows, and wherein generating the graph includes:
      adding a first entry of the plurality of entries to the graph, wherein the first entry of the plurality of entries represents the sequence of flows in a first stack of the plurality of stacks;
      for a remaining stack of the plurality of stacks after the first stack of the plurality of entries:
         determining that a particular sequence of flows included in the remaining stack of the plurality of stacks does not match a previous sequence of flows included in a previous stack of the plurality of stacks; and
         based on the determining that the particular sequence of flows included in the remaining stack of the plurality of stacks does not match the previous sequence of flows included in the previous stack of the plurality of stacks, adding a new entry to the graph;
   determining that a weight value for a particular entry of the plurality of entries included in the graph fails to satisfy a weight value threshold; and
   removing the particular entry of the plurality of entries from the graph based on the determining that the weight value for the particular entry of the plurality of entries fails to satisfy the weight value threshold.

8. The method of claim 7, wherein removing the particular entry of the plurality of entries from the graph produces a trimmed graph, the method further comprising writing remaining entries of the trimmed graph to a memory in an order of decreasing weight values.

9. The method of claim 7, further comprising merging the graph with another graph by reading and combining weight values for matching entries.

10. The method of claim 7, wherein:
   each stack of the plurality of stacks is received in a format that represents a first flow in the sequence of flows using an address and each flow in the sequence of flows after the first flow in the sequence of flows uses an address offset from a previous flow in the sequence of flows; and
   the method further comprises:
      recalculating an address for each flow in the sequence of flows using the address that represents the first flow in the sequence of flows and at least one address offset that represents each flow in the sequence of flows after the first flow in the sequence of flows; and
using the address for each flow in the sequence of flows as a flow identification in the graph.

11. The method of claim 10, wherein the address and the address offset are encoded using variable bit encoding.

12. The method of claim 7, further comprising:
based on the determining that the particular sequence of flows included in the remaining stack of the plurality of stacks does not match the previous sequence of flows included in the previous stack of the plurality of stacks, determining that a remaining flow identification included in the remaining stack of the plurality of stacks matches a previous flow identification included in the previous stack of the plurality of stacks; and
adding a pointer from the new entry to an existing entry that includes the previous flow identification.

13. The method of claim 7, wherein the graph includes playback data that includes a timestamp for each time a flow is executed and that identifies a thread identification or a process identification associated with each time the flow is executed.

14. A system comprising:
a processing unit; and
computer-readable storage media storing instructions that, when executed by the processing unit, cause the system to:
generate a graph for a stack file that includes a plurality of stacks by sequentially accessing and reading the plurality of stacks from the stack file, wherein:
each stack of the plurality of stacks includes a sequence of flows being executed;
the graph includes a plurality of entries; and
each entry of the plurality of entries represents a unique sequence of flows and includes a weight value that represents a number of times the unique sequence of flows occurs in the stack file;
determine that a weight value for an entry of the plurality of entries fails to satisfy a weight value threshold; and
remove the entry of the plurality of entries from the graph based on the determining that the weight value for the entry of the plurality of entries fails to satisfy the weight value threshold.

15. The system of claim 14, wherein removing the entry of the plurality of entries from the graph produces a trimmed graph, and the instructions further cause the system to write remaining entries of the trimmed graph to a memory in an order of decreasing weight values.

16. The system of claim 14, wherein the instructions further cause the system to merge the graph with another graph by reading and combining weight values for matching entries.

17. The system of claim 14, wherein:
each stack of the plurality of stacks is received in a format that represents a first flow in the sequence of flows using an address and each flow in the sequence of flows after the first flow in the sequence of flows uses an address offset from a previous flow in the sequence of flows; and
the instructions further cause the system to:
recalculate an address for each flow in the sequence of flows using the address that represents the first flow in the sequence of flows and at least one address offset that represents each flow in the sequence of flows after the first flow in the sequence of flows; and
use the address for each flow in the sequence of flows as a flow identification in the graph.

18. The system of claim 17, wherein the address and the address offset are encoded using variable bit encoding.

19. The system of claim 14, wherein the graph includes playback data that includes a timestamp for each time a flow is executed and that identifies a thread identification or a process identification associated with each time the flow is executed.

20. The system of claim 14, wherein the instructions further cause the system to receive the stack file from a machine.

* * * * *